United States Patent [19]
Jennings, Jr.

[11] Patent Number: 5,452,764
[45] Date of Patent: * Sep. 26, 1995

[54] CEMENTING EFFICIENCY IN HORIZONTAL WELLBORES VIA DUAL DENSITY FLUIDS AND CEMENTS

[75] Inventor: Alfred R. Jennings, Jr., Plano, Tex.

[73] Assignee: Mobil Oil Corporation, Fairfax, Va.

[ * ] Notice: The portion of the term of this patent subsequent to Jun. 14, 2028 has been disclaimed.

[21] Appl. No.: 151,630

[22] Filed: Nov. 15, 1993

Related U.S. Application Data

[63] Continuation-in-part of Ser. No. 952,129, Sep. 28, 1992, Pat. No. 5,402,849.

[51] Int. Cl.$^6$ ............................ E21B 33/14; E21B 33/16; E21B 37/00
[52] U.S. Cl. ................ 166/291; 166/312; 166/50
[58] Field of Search ................ 166/50, 285, 291, 166/292, 312

[56] References Cited

U.S. PATENT DOCUMENTS

| | | | |
|---|---|---|---|
| Re. 30,484 | 1/1981 | Broaddus et al. | 166/307 |
| 3,902,911 | 9/1975 | Messenger | 106/97 |
| 4,120,360 | 10/1978 | Messenger | 166/293 |
| 4,386,665 | 6/1983 | Dellinger | 175/61 |
| 4,860,830 | 8/1989 | Jennings et al. | 166/312 |
| 5,027,900 | 7/1991 | Wilson | 166/50 X |
| 5,095,987 | 3/1992 | Weaver et al. | 166/50 X |
| 5,188,176 | 2/1993 | Carpenter | 166/292 X |

*Primary Examiner*—George A. Suchfield
*Attorney, Agent, or Firm*—Alexander J. McKillop; George W. Hager, Jr.; Charles A. Malone

[57] ABSTRACT

A well completion process for improved cement placement in a horizontal wellbore where dual density cleaning fluids are circulated down the wellbore for conditioning and cleaning it. Afterwards, a production tube containing centralizers is positioned centrally within the wellbore. Next, "spacer fluids" of higher and lower densities are circulated within an annulus formed by the space between the tube and the wellbore so as to more substantially clean the annulus out. Subsequently, a cement having a density greater than the spacer fluid is pumped into the annulus. Thereafter, a light weight cement is pumped into the annulus thereby overriding the heavier cement and removing voids in the annulus resulting in more efficient cement placement.

23 Claims, 1 Drawing Sheet

CEMENTING EFFICIENCY IN HORIZONTAL WELLBORES VIA DUAL DENSITY FLUIDS AND CEMENTS

This application is a continuation-in-part of application Ser. No. 952,129, filed Sep. 28, 1992 which issued as U.S. Pat. No. 5,402,849 on Jun. 14, 1994.

FIELD OF THE INVENTION

This invention is directed to a method for improved cementing of a well located in an underground formation. More particularly, it is directed to the effective cementing of a horizontal wellbore via dual density fluids and cements.

BACKGROUND OF THE INVENTION

With advances in drilling technology, it is currently possible to drill horizontal wellbores deep into hydrocarbon producing reservoirs. There are many advantages to a horizontal well completion including extending contact with a producing formation thereby facilitating drainage and production of the reservoir.

Although horizontal wellbores allow more contact with the producing formation, one encounters some difficulties in well completions associated with horizontal wellbores not commonly dealt with in vertical wells. One area of concern in well completions is the inability to effectively cement voids along the horizontal section during a cementing operation. Effective cementing of the tubing to the wellbore is routinely accomplished in vertical wellbores. However, in horizontal wellbores and severely inclined wellbores, i.e. those having an angle of deviation greater than about 45°, cementing is much more difficult. Therefore, the efficiency of zone isolation diminishes considerably.

In oil and gas well completions it is imperative to effectively isolate the oil or gas bearing formation from other zones in the wellbore. This is most frequently accomplished by cementing the production casing in place and then perforating the wellbore in the production horizon to allow hydrocarbon flow into the wellbore. With effective cementing, flow up the outside of the production casing is eliminated and the oil and/or gas producing zone is effectively isolated.

Often a failure of the cementing operation occurs in horizontal wellbores because the density of the cement does not allow sufficient displacement of drilling mud and other residue from the tubing/wellbore annulus, thereby resulting in channeling of cement and improper tubing or pipe/formation bonding. Failure also occurs because formation fines and cuttings remain in the borehole after the drilling operation thereby contaminating the cement. When the cement is contaminated, the cement's bonding and strength is interfered with as the well is completed.

The kind of contaminant remaining in a wellbore depends of course on the operation previously conducted therein. Composition of fluids used in previous operations can vary. Drilling muds, completion fluids, and workover fluids have varying compositions.

Drilling muds are those fluids used in rotary drilling to cool and lubricate the bit, lift cuttings from the borehole, and to control borehole pressure. Drilling muds should have a viscosity, density, and a fluid retention level suitable for the particular drilling application and the formation being drilled. For instance, a drilling mud generally must be sufficiently dense to control the pressure of the well and simultaneously have sufficient plasticity to carry and lift cuttings from the well.

Completion fluids are those fluids used after drilling is complete and during the steps of completion of the well. Completion can include cementing the casing, perforating the casing, setting the tubing the pump, etc.

Workover fluids are those fluids used during remedial work in the well. This can include removing tubing, replacing a pump, cleaning out sand or other deposits, reperforating, etc. Workover also broadly includes steps used in preparing an existing well for secondary or tertiary oil recovery such as polymer additions, micellar flooding, steam injection, etc., or for well stimulation such as acidizing, and fracturing the formation, etc.

If problems involving the composition of the various fluids used in a wellbore weren't enough, there is the added problem of air pockets within a horizontal wellbore which prevent portions of a wellbore from being contacted with a cleaning fluid.

Therefore, what is needed is a method for improving the effectiveness of the cementing operation in a deviated or horizontal wellbore which provides complete removal of contaminants and void spaces in the horizontal section due to incomplete displacement of wellbore materials and the effects of gravity on high density cement.

SUMMARY OF THE INVENTION

This invention is directed to a well completion process for improved cement placement in a horizontal wellbore located in a formation having productive and non-productive intervals. In the practice of this invention, dual density cleaning fluids are circulated down the wellbore in an amount and for a time sufficient to condition and clean the wellbore for cementing a production tubing or casing in place.

Afterwards, a production tubing having centralizers therearound is placed into the wellbore so as to locate the tubing centrally within the wellbore. Next, a first cement "spacer" fluid with a known density or specific gravity is directed down an annular space or annulus formed between the tubing and the wellbore so as to substantially clean-out this space in order to provide better bonding. Placement of the first spacer fluid down the annulus is stopped and the fluid is allowed to equilibrate. After the fluid has equilibrated, a second spacer fluid having a specific gravity of at least 0.1 less than that of the first spacer fluid is directed down the annulus which causes the second spacer fluid to contact debris or contaminates in the top of the annulus while the first spacer fluid contacts contaminants in the bottom section of said annulus.

Introduction of the second cement spacer fluid into the annulus is ceased and both fluids are allowed to equilibrate. Thereafter, both spacer fluids are removed from the annulus along with the debris or contaminants. Later, a first cement is directed down the annular space or annulus and up the tubing which cement has a density greater than the cement spacer fluid and is in an amount sufficient to fill the annulus. Subsequently, a second cement is directed down the annulus and up the tubing. This cement has a density less than the density of the first cement which causes it to override the first cement thereby filling any voids along the horizontal section which were unfilled by the first cement so as effectively isolate the casing from the formation.

It is therefore an object of this invention to effectively clean debris such as drilling mud or other drilling residues from a horizontal wellbore particularly the annulus, prior to cementing the casing therein.

It is another object of this invention to remove "voids" from a horizontal wellbore which were caused by the incomplete displacement of a high density cement therein.

It is yet another object of this invention to effectively cement an annular space in a horizontal wellbore so as to prevent cement channeling and thereby effectively isolate an oil or gas bearing zone of the formation from other zones.

DESCRIPTION OF THE PREFERRED EMBODIMENTS

This invention is directed to a well completion process for improved cement placement in a horizontal wellbore which is located in a hydrocarbonaceous fluid bearing formation. In the practice of this invention, dual density cleaning fluids are directed down said wellbore in an amount and for a time sufficient to condition and clean it so as to enable a production tubing or casing to be cemented in place.

One such method is disclosed in U.S. Pat. No. 4,860,830 which issued to Jennings, Jr. et al. on Aug. 29, 1989. This patent is hereby incorporated by reference herein. Via this method, a first cleaning fluid having a known specific gravity is introduced into a horizontal wellbore. Thereafter, a second fluid having a specific gravity less than that of the first fluid is introduced into the wellbore. Said second fluid overrides the first fluid and contacts contaminants in the top section of the wellbore while said first fluid contacts contaminants in the bottom section of said wellbore.

After the first cleaning fluid of known specific gravity is introduced into the wellbore, it is allowed to equilibrate. After equilibration, the second cleaning fluid is introduced to the wellbore. Once a sufficient amount of the second cleaning fluid has been introduced into the wellbore, it is allowed to equilibrate after contacting contaminants on the horizontal top section of the wellbore. Additional details regarding the characteristics of these fluids are discussed below in connection with the cement spacer fluids of different densities. The concentration and kinds of cement spacer fluids utilized below can also be used when cleaning out the wellbore prior to positioning the production tubing therein.

Figure 1:
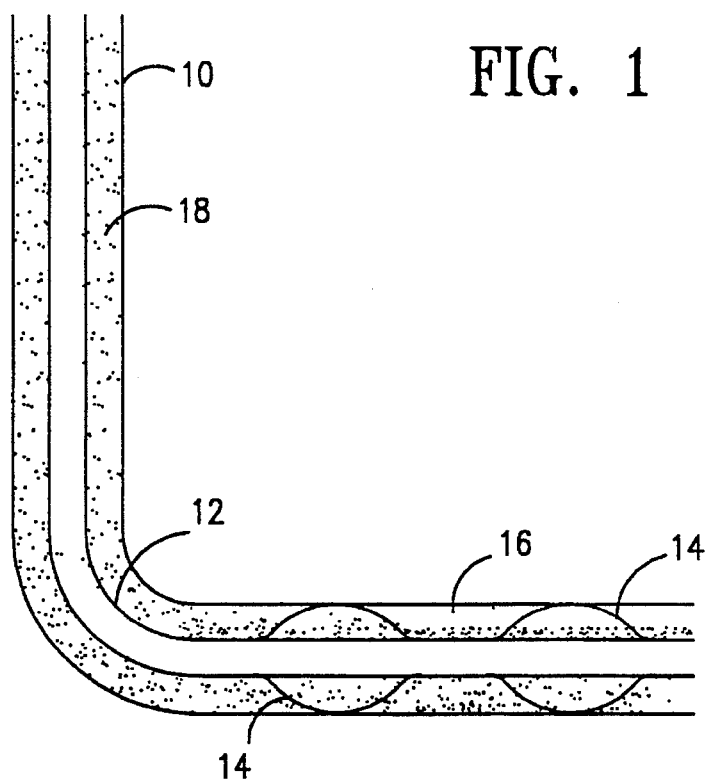
FIG. 1 is a schematic representation which depicts an inclined wellbore having centralizers therearound which details a void space in said wellbore's annulus.

It is well known in the art how to drill deviated boreholes into a formation. One method for drilling a deviated wellbore wherein multi-penetration of a mineral bearing formation is undertaken is described in U.S. Pat. No. 4,386,665 which issued to Dellinger on Jun. 7, 1983. This patent is hereby incorporated by reference herein. An example of a deviated wellbore is shown in FIG. 1. Once the deviated wellbore has been directed into the formation as desired and the cleaning fluid has removed the debris, mud, or drilling fluid from the horizontal wellbore, a production tubing or casing 12 is directed down borehole 10. In order to locate the tubing or casing in wellbore 10, pipe centralizers 14 are placed around the tubing prior to directing it into the wellbore. Once in wellbore 10, casing 12 or tubing is centralized therein as is shown in FIG. 1.

After positioning the production tubing or casing 12 centrally in the wellbore as desired, a first cement spacer of fluid with a high density is directed down the annulus formed by the production tubing or casing inside of wellbore 10. This cement spacer should have a specific gravity of from about 1.0 to about 1.4 at room temperature. Room temperature as defined herein means a temperature of from about 15° C. to about 20° C. Preferred high density fluids include aqueous sodium chloride solutions, aqueous calcium chloride solutions, and aqueous potassium chloride solutions.

Upon entry into the annulus, the first cement spacer fluid of high density agitates and mixes with the solid contaminants and water on the bottom of said annulus. These solid contaminants include drilling mud, metal cuttings, formation fines, and other foreign solid matter. These contaminants remain suspended in the first fluid. The high density spacer fluid also mixes with water which may have separated from hydrocarbonaceous fluids when said fluids were being pumped to the surface through said wellbore. As the high density spacer fluid mixes with the solid contaminants, these contaminants tend to remain suspended because of the fluid's high density. After a sufficient amount of high density spacer fluid has been introduced into the annulus, pumping is ceased and the high density fluid is allowed to equilibrate. Equilibration will generally take from about 0.25 to about 0.50 hours.

After the high density fluid cement spacer has been allowed sufficient time to equilibrate, a second cement spacer fluid having a density less than said first high density spacer fluid is pumped or otherwise introduced into the annulus. The second lower density cement spacer fluid overrides the high density spacer fluid while the high density spacer fluid remains in contact with the lower portion of the annulus. Upon overriding the high density spacer fluid, said lower density spacer fluid contacts the top portion of the annulus and removes hydrocarbonaceous matter from said top portion. While overriding the first high density spacer fluid, the second lower density spacer fluid enters into portions of the annulus containing air pockets. Here it displaces said air pockets and contacts hydrocarbonaceous matter on the top side of the annulus. Said lower density spacer fluid is pumped into the annulus in an amount and for a time sufficient to remove air pockets and mix with the hydrocarbonaceous matter. Thereafter, pumping is ceased and the lower density spacer fluid is allowed sufficient time to equilibrate. After the lower density spacer fluid has been allowed sufficient to equilibrate, additional wellbore volumes of lower density spacer fluid are pumped or introduced into the annulus.

Once sufficient wellbore volumes of lower density spacer fluid have been introduced into the annulus, it and the higher density spacer fluid are removed from the annulus. Prior to cementing or otherwise completing the wellbore, it is flushed with a high density brine solution.

Lower density spacer fluids which can be used herein include brine, diesel fuel, kerosene, or xylene and mixtures or compounds having similar characteristics, and mixtures thereof. When brine is used herein it should have a density of about 1.0 to 1.2. Brine solutions which can be utilized herein include aqueous sodium chloride, aqueous calcium chloride, aqueous zinc chloride, and aqueous potassium chloride. These solutions are discussed in U.S. Pat. Re. No. 30,484 which issued to Broaddus et al. on Jan. 20, 1981.

This patent is hereby incorporated by reference herein. This patent also discloses the use of fluids with different densities during fracture acidizing. Other brine solutions which can be used include aqueous sodium bromide, aqueous calcium bromide, aqueous potassium bromide, and zinc bromide.

In accordance with the method of the present invention, the densities of the high and low density fluids are controlled to cause separation and segregation of the fluids into an upper and lower zone of the annulus.

In order to achieve separation and segregation between the fluids used, the densities thereof must be such that a difference in the specific gravities of the fluids of at least about 0.025 exists at the conditions existing in the wellbore to be treated. Preferably, fluids are utilized having a specific gravity difference of about 0.10 at the conditions in the wellbore which create a pronounced vertical movement of one fluid with respect to the other. In treatments where an extreme overriding of one fluid with respect to another is required, a specific gravity difference of 0.20 between the fluids is preferred.

High viscosity fluids tend to move through a wellbore as a mass with less tendency to be affected by differing densities than low viscosity fluids. Low viscosity fluids on the other hand readily override and underride fluids of differing density. Therefore, high and low density fluids having apparent viscosities of less than about 100 cps at the temperatures existing in the wellbore into which they are to be introduced are generally preferred for use in accordance with this invention. However, higher viscosity high and low density fluids can be used if the circumstances dictate and overriding can be accentuated by utilizing fluids of differing viscosity. More specifically, the segregation and separation of the high and low density fluids can be enhanced by using a high density fluid having a higher viscosity than the low density fluid. Preferably when high density and low density fluids of different viscosity are used, the high density fluid viscosity is in the range of from about 5 to about 80 times the viscosity of the low density fluid.

Minimum high and low density fluids are listed in U.S. Pat. No. 4,860,830 which issued to Jennings et al. on Aug. 29, 1989. This patent is hereby incorporated by reference herein. Once spacer fluids have been directed down the annulus in an amount sufficient to substantially clean-out the wellbore, circulation of the cement spacer fluids down the annulus is terminated.

After terminating the circulation of the cement spacer fluids down the annulus and up through the casing or tubing 12 for a time sufficient to substantially remove all of the debris or contaminants from the wellbore, a cement slurry is introduced into the annulus. As is shown in FIG. 1 the cement slurry flows down the annulus and up the tubing or casing 12. Since the cement which is first directed down the annulus is heavy, gravitational forces on said cement cause void space 16 to remain after the cement has been forced down the annulus. This happens since the heavy cement is pulled to the bottom of the horizontal tubing or casing as it flows down the annulus. The term "cement slurry" is intended to include hydraulic aqueous slurries of hydraulic and pozzolan cement. Exemplary hydraulic cements include Portland cement, either of the normal, high early strength or slow setting types; mixtures of lime, silica and aluminum; mixtures of lime, magnesium, silica, alumina or iron oxide; hydraulic limes, draper cement; pozzolan, and natural cements. The pozzolan cements include a cement made from slaked lime and granulated blast furnace slag.

Most wells cementing operation employ Portland cement meeting API specifications. These are introduced into the well as a neat slurry in which the weight ratio of water to cement is between about 0.25 and 0.65 (i.e., 3–10 gallons of water per sack of cement). Once the first cement has been directed down the annulus and up production tubing or casing 12 for a desired amount of time to obtain the desired volume of cement in the annulus, flow of the first cement down said annulus and up the tubing is ceased. This first cement slurry which is directed down the annulus and up the tubing will have a density greater than the cement spacer of fluid.

Figure 2:
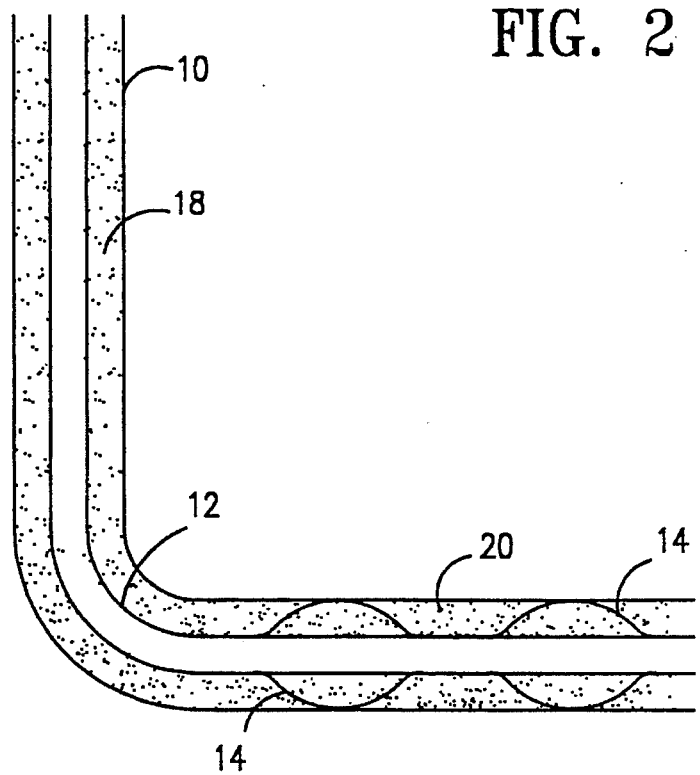
FIG. 2 is a schematic representation of an inclined wellbore which shows removal of the void from the annulus and more complete cementing of the pipe through the use of a combination of high density and low density cements.

Before the first cement sets or hardens, a second cement slurry is directed down the annulus and up the tubing at a rate and pressure sufficient to override the first cement thereby filling any void spaces 16 which appear along horizontal wellbore 10. This second cement has a density less than the first cement and is therefore unable to displace the first denser cement. The second cement is directed down the wellbore to fill any voids which were unfilled by the first cement so as to effectively isolate the production tubing or casing 10 from the formation. Once the second light cement has been directed down the annulus as desired, both cements will appear as shown in FIG. 2. Both cements are allowed to remain in the annulus for a time sufficient to harden. Once hardened, the combined cements effectively bond the casing to the borehole since all voids are removed from the annulus. Thus, the formation is effectively sealed off from the tubing along its entire length thereby preventing the channeling of undesired fluids into subsequently perforated areas of the wellbore during production of desired fluids from the formation.

Representative low density cements which can be utilized herein comprise foamed cements and a light cement sold by Haliburton under the "SPHERELITE" light cement sold by Halliburton Company located in Duncan, Okla. Similar cement compositions are disclosed in U.S. Pat. Nos. 3,902,911 and 4,120,360 which are hereby incorporated by reference herein.

Obviously, many other variations and modifications of this invention as previously set forth may be made without departing from the spirit and scope of this invention as those skilled in the art readily understand. Such variations and modifications are considered part of this invention and within the purview and scope of the appended claims.

What is claimed is:

1. A well completion method for improved cement placement in a horizontal wellbore located in a formation comprising:

a) circulating dual density cleaning fluids down the wellbore in an amount and for a time sufficient to condition and clean it for cementing a production tubing or casing in place comprising, i) introducing into said wellbore a first cleaning fluid having a known specific gravity, ii) ceasing the introduction of the first fluid and allowing it to equilibrate, iii) introducing a second cleaning fluid into the wellbore which has a density less than the first cleaning fluid sufficient to override said first fluid and contact contaminants in the top section of the wellbore while the first fluid contacts contaminants in the bottom section of said wellbore, iv) ceasing the introduction of said first fluid and allowing both fluids to equilibrate, and v) removing both fluids containing said contaminants from the wellbore thereby cleaning it;

b) directing a production tubing with centralizers therearound into the wellbore thereby locating the tubing centrally within the wellbore;

c) directing a first cement spacer fluid of a known density down an annulus formed between the tubing and wellbore so as to substantially clean-out the wellbore;

d) ceasing the introduction of the first cement spacer down said annulus thereby allowing said first cement spacer to equilibrate;

e) introducing into said annulus a second cement spacer fluid having a specific gravity of at least about 0.1 less than the specific gravity of said first cement spacer fluid whereby said second cement spacer fluid overrides said first cement spacer fluid so as to contact contaminants in the top section of said annulus while said first cement spacer fluid contacts contaminants in the bottom section of said annulus;

f) ceasing the introduction of said second cement spacer fluid into the annulus and allowing both fluids to equilibrate;

g) removing both cement spacer fluids containing said contaminants from said wellbore thereby cleaning said annulus;

h) directing a first cement slurry down the annulus and up the tubing which cement slurry has a density greater than the cement spacer fluid and is in an amount sufficient to fill the annulus; and i) directing a second cement slurry down the annulus which cement slurry has a density less than the density of the first cement slurry and which overrides the first cement slurry thereby filling any voids that were unfilled by the first cement slurry so as to effectively isolate the casing from the formation.

2. The method as recited in claim 1 where said first spacer fluid is selected from a member of the group consisting of aqueous potassium chloride, sodium chloride, calcium chloride, zinc chloride, potassium bromide, sodium bromide, calcium bromide, and zinc bromide.

3. The method as recited in claim 1 where said second fluid is selected from a member of the group consisting of diesel fuel, kerosene, xylene, aqueous potassium chloride, sodium chloride, and calcium chloride.

4. The method as recited in claim 1 where after step f) additional wellbore volumes of said second cement spacer fluid are introduced into said wellbore and removed.

5. The method as recited in claim 1 where the apparent viscosities of the first and second fluids in said annulus are less than about 100 cps at the temperature existing in said wellbore.

6. The method as recited in claim 1 wherein said second fluid has a specific gravity range of about 0.50 to about 1.20 at room temperature.

7. The method as recited in claim 1 where the first fluid has a viscosity of about 5 to about 80 times greater than the viscosity of the second fluid.

8. The method as recited in claim 1 where the first fluid has a specific gravity of about 1.0 to about 1.4 at room temperature.

9. The method as recited in claim 1 where in step a) i) said first cleaning fluid mixes with solid contaminants and said contaminants remain suspended in the first cleaning fluid.

10. The method as recited in claim 1 where the apparent viscosities of the first and second fluids in said annulus are less than about 100 cps at the temperature existing in said wellbore and where the first cement slurry comprises a hydraulic cement and the second cement slurry comprises a light weight or foamed cement.

11. The method as recited in claim 1 where the first spacer fluid has a viscosity of about 5 to about 80 times greater than the viscosity of the second fluid and where the first cement slurry comprises a hydraulic cement and the second cement slurry comprises a light weight or foamed cement.

12. The method as recited in claim 1 where in step a) the dual density fluids comprise a first higher density cleaning fluid that is selected from a member of the group consisting of aqueous potassium chloride, sodium chloride, calcium chloride, zinc chloride, potassium bromide, sodium bromide, calcium bromide, and zinc bromide.

13. The method as recited in claim 1 where in step a) the dual density fluids comprise a second lower density cleaning fluid that is selected from a member of the group consisting of diesel fuel, kerosene, xylene, aqueous potassium chloride, sodium chloride, and calcium chloride.

14. The method as recited in claim 1 where the dual density cleaning fluids comprise a first cleaning fluid that has a viscosity of about 5 to about 80 times greater than the viscosity of the second cleaning fluid.

15. A well completion method for improved cement placement in a horizontal wellbore located in a formation comprising:

a) circulating dual density cleaning fluids down the wellbore in an amount and for a time sufficient to condition and clean it for cementing a production tubing or casing in place comprising, i) introducing a first higher density cleaning fluid that has a specific gravity of about 1.0 to about 1.4 at room temperature, and thereafter ii) introducing a second lower density cleaning fluid that has a specific gravity of about 0.50 to about 1.20 at room temperature which second density cleaning fluid overrides the first higher density cleaning fluid and contacts contaminants in the top section of the wellbore while the first fluid contacts contaminants in the bottom section of the wellbore, and iii) removing both fluids containing said contaminants from the wellbore thereby cleaning it;

b) directing a production tubing with centralizers therearound into the wellbore thereby locating the tubing centrally within the wellbore;

c) directing a first cement spacer fluid of a known density down an annulus formed between the tubing and wellbore so as to substantially clean-out the wellbore;

d) ceasing the introduction of the first cement spacer down said annulus thereby allowing said first cement spacer to equilibrate;

e) introducing into said annulus a second fluid having a specific gravity of at least about 0.1 less than the specific gravity of said first cement spacer fluid whereby said second spacer fluid overrides said first spacer fluid so as to contact contaminants in the top section of said annulus while said first fluid contacts contaminants in the bottom section of said annulus;

f) ceasing the introduction of said second cement spacer fluid into the annulus and allowing both fluids to equilibrate;

g) removing both cement spacer fluids containing said contaminants from said wellbore thereby cleaning said annulus;

h) directing a first cement slurry down the annulus and up the tubing which cement slurry has a density greater than the cement spacer fluid and is in an amount sufficient to fill the annulus; and i) directing a second cement slurry down the annulus which cement slurry has a density less than the density of the first cement slurry and which overrides the first cement slurry thereby filling any voids that were unfilled by the first cement slurry so as to effectively isolate the casing from the formation.

16. The method as recited in claim 15 where said first cleaning fluid is selected from a member of the group consisting of aqueous potassium chloride, sodium chloride, calcium chloride, zinc chloride, potassium bromide, sodium bromide, calcium bromide, and zinc bromide.

17. The method as recited in claim 15 where said second cleaning fluid is selected from a member of the group consisting of diesel fuel, kerosene, xylene, aqueous potassium chloride, sodium chloride, and calcium chloride.

18. The method as recited in claim 15 where after step a) ii), additional wellbore volumes of said second cleaning fluid are introduced into said wellbore and removed.

19. The method as recited in claim 15 step a) the apparent viscosities of the first and second fluids in said annulus are less than about 100 cps at the temperature existing in said wellbore.

20. The method as recited in claim 15 step a) i) the first fluid has a viscosity of about 5 to about 80 times greater than the viscosity of the second fluid.

21. The method as recited in claim 15 where in step a)i) said first fluid mixes with solid contaminants and said contaminants remain suspended in the first fluid.

22. The method as recited in claim 15 step a) where the apparent viscosities of the first and second fluids in said wellbore are less than about 100 cps at the temperature existing in said wellbore and where the first cement slurry comprises a hydraulic cement and the second cement slurry comprises a light weight or foamed cement.

23. The method as recited in claim 15 step a) where the first cleaning fluid has a viscosity of about 5 to about 80 times greater than the viscosity of the second cleaning fluid and where the first cement slurry comprises a hydraulic cement and the second cement slurry comprises a light weight or foamed cement.

\* \* \* \* \*